Dec. 9, 1969    R. J. GOWEN    3,482,565
DIGITAL BLOOD PRESSURE MEASURING DEVICE
Filed March 24, 1964    4 Sheets-Sheet 1
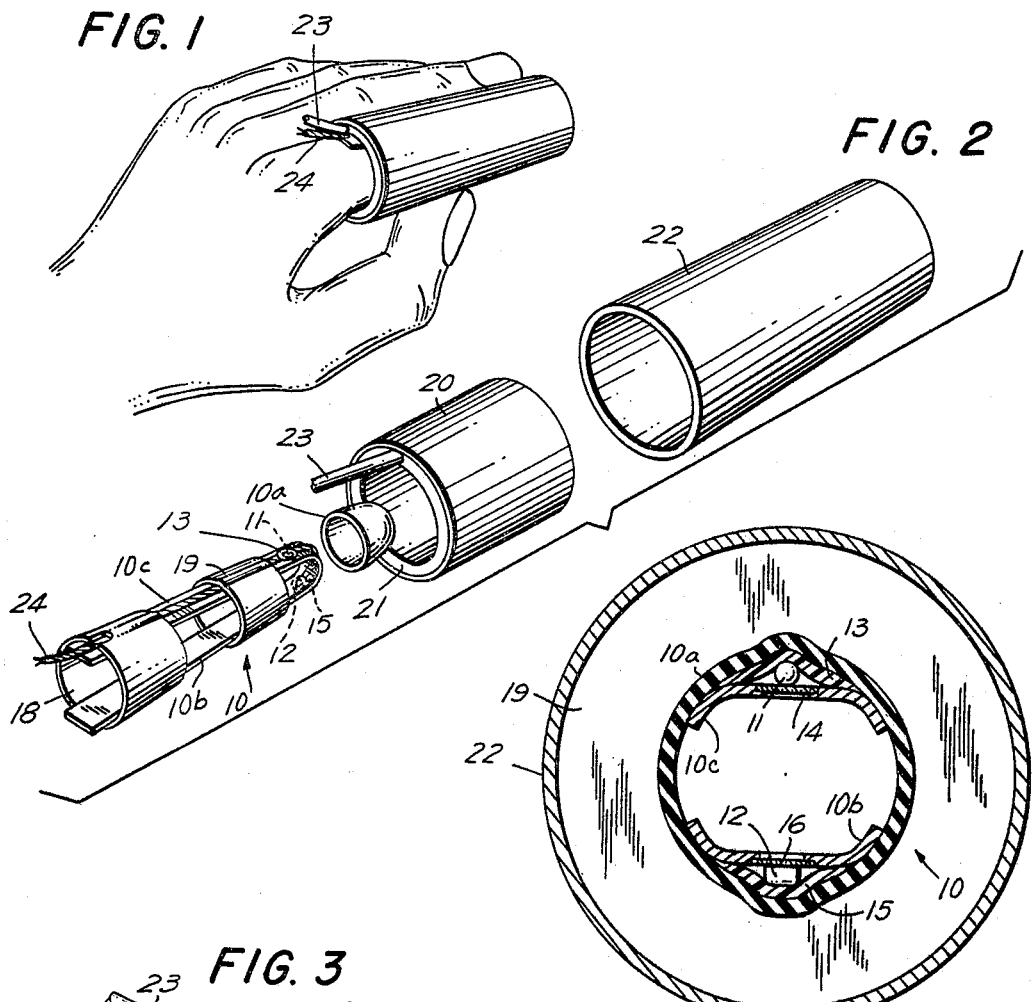
INVENTOR.
RICHARD J. GOWEN
BY
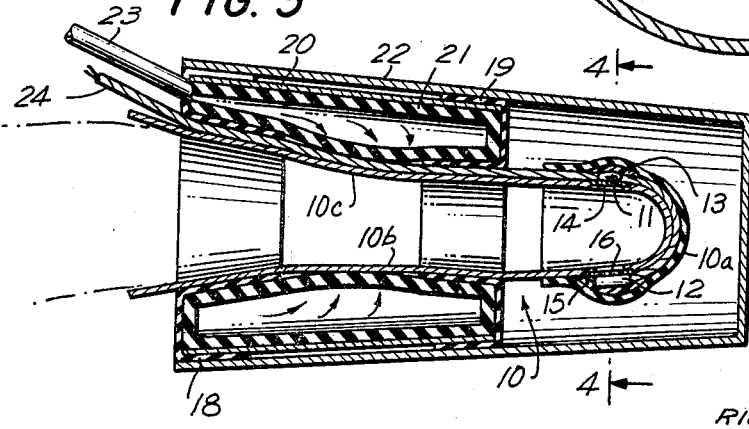
ATTORNEYS Dec. 9, 1969  R. J. GOWEN  3,482,565
DIGITAL BLOOD PRESSURE MEASURING DEVICE
Filed March 24, 1964  4 Sheets-Sheet 2

INVENTOR.
RICHARD J. GOWEN
BY
Morgan, Finnegan, Durham & Pine
ATTORNEYS

INVENTOR.
RICHARD J. GOWEN
BY
Morgan, Finnegan, Durham & Pine
ATTORNEYS

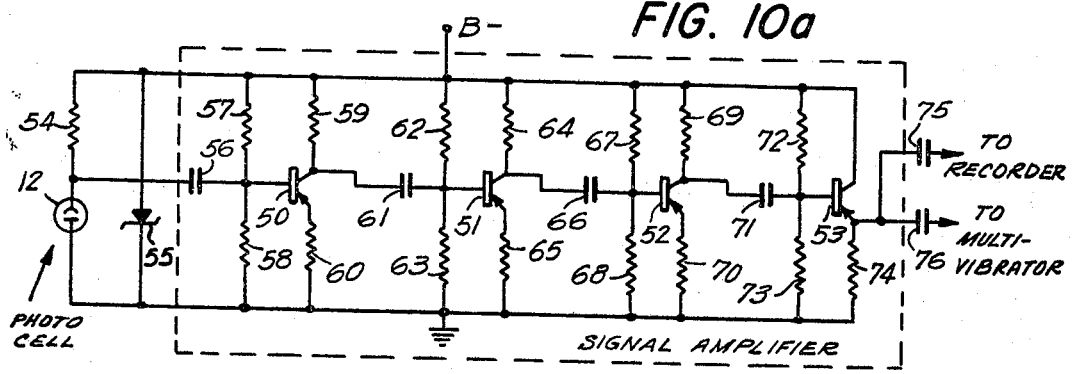
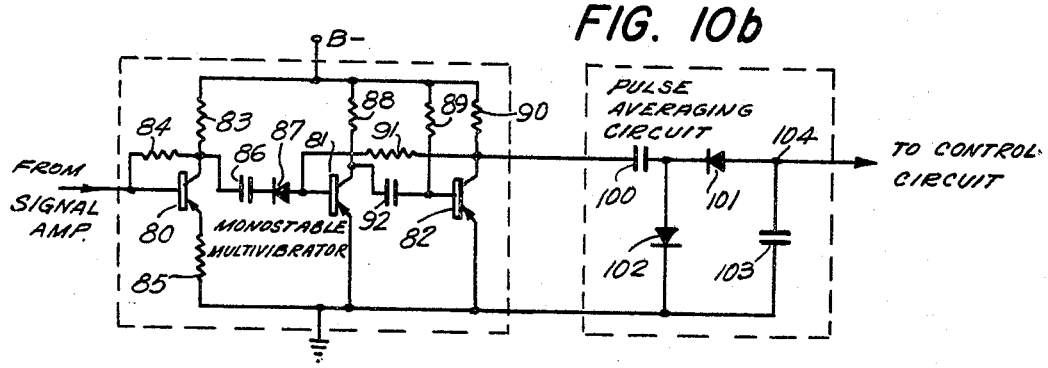
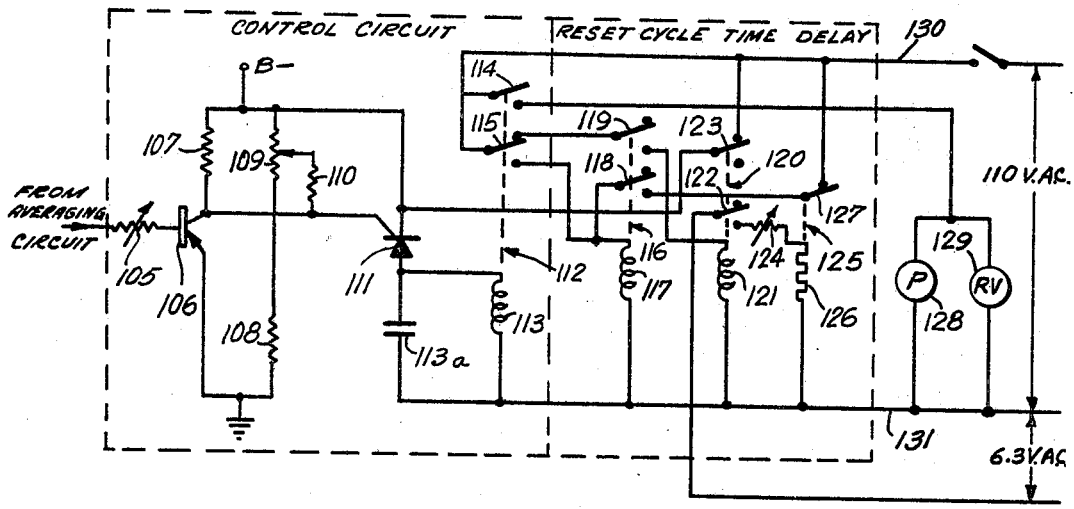

United States Patent Office 3,482,565
Patented Dec. 9, 1969

3,482,565
DIGITAL BLOOD PRESSURE MEASURING DEVICE
Richard J. Gowen, El Paso County, Colo., assignor to Carter-Wallace, Inc., a corporation of Maryland
Filed Mar. 24, 1964, Ser. No. 354,255
Int. Cl. A61b 5/02
U.S. Cl. 128—2.05                                10 Claims

ABSTRACT OF THE DISCLOSURE

A blood pressure measuring device having a support carried by one of the subject's extremities which serves to mount a source of electromagnetic energy on the opposite side of the extremity from a responsive device which generates a pulsating signal as a function of the change of quantity of subject's blood in the extremity. An electrical display of the pulsating signal is compared to a second signal displayed on a common time base which represents pressure applied to the extremity for the purpose of occluding blood flow therethrough. Systolic and diastolic blood pressure is read from the ordinate of the pressure curve by proper alignment of significant points on the pulsating display with the pressure curve.

---

This invention relates to apparatus for measuring the systolic and diastolic blood pressures in a human patient.

Blood pressure is usually measured by means of manually operated sphygmomanometers including an inflatable cuff which is placed surrounding the upper arm of the patient and a manometer connected to the cuff to indicate air pressure. The cuff is inflated by means of a manually operated squeeze bulb until the pressure in the cuff is sufficient to occlude the bronchial artery in the arm. Pressure in the cuff is thereafter reduced by means of a manually operated valve until the blood begins to pass through the artery in spurts. The sound of these spurts is detected by means of a stethoscope. The cuff pressure at which blood begins to flow through the artery is indicated by the manometer and is the systolic pressure.

After the systolic pressure has been determined, the pressure in the cuff is reduced further until the sound created by the spurts disappears. This occurs when the pressure in cuff is reduced to a point where there is no significant occlusion in the bronchial artery and the corresponding pressure indication on the manometer is the diastolic pressure.

An object of this invention is to provide an automatic sphygmomanometer device capable of indicating the diastolic and systolic pressures.

Another object is to provide an automatic sphygmomanometer device capable of providing large number of successive indications of the diastolic and systolic pressures so that the patient's blood pressure can be monitored continuously.

Still another object is to provide an automatic sphygmomanometer device which can continuously monitor blood pressure while the patient is performing various exercises or engaging in other activities.

Yet another object is to provide a sphygmomanometer device which indicates blood pressure without detecting the sound created by spurts of blood within the artery thereby eliminating inaccuracies introduced when the sound is not properly detected.

Another object is to provide a sphygmomanometer device which measures the diastolic and systolic pressures within a relatively short period of time thereby eliminating inaccuracies introduced by movements of the patent during the tests.

Another object of the invention is to provide graphic illustrations of blood pressure measurements over an extended period of time.

The foregoing and other objects are achieved in accordance with this invention as illustrated in the drawings and described in the following specification which illustrates one advantageous embodiment of the invention. The drawings form part of the specification wherein:

FIG. 1 is a drawing showing a pulse sensor unit positioned surrounding a patient's finger;

FIG. 2 is an exploded perspective view showing the components making up the combined cuff and pulse detector unit;

FIG. 3 is a cross sectional view of the assembled combined cuff and pulse detector unit with the cuff partially inflated;

FIG. 4 is a cross sectional view of the combined cuff and pulse detector unit taken along line 4—4 in FIG. 3;

FIG. 10a is a schematic diagram of the signal amplifier for the system shown in FIG. 8;

FIG. 10b is a schematic diagram of the monostable multivibrator circuit and the pulse averaging circuit for the system shown in FIG. 8; and FIG. 10c is a schematic diagram of the control circuit and the reset cycle time delay circuit for the system shown in FIG. 8.

INTRODUCTION

Figure 5:
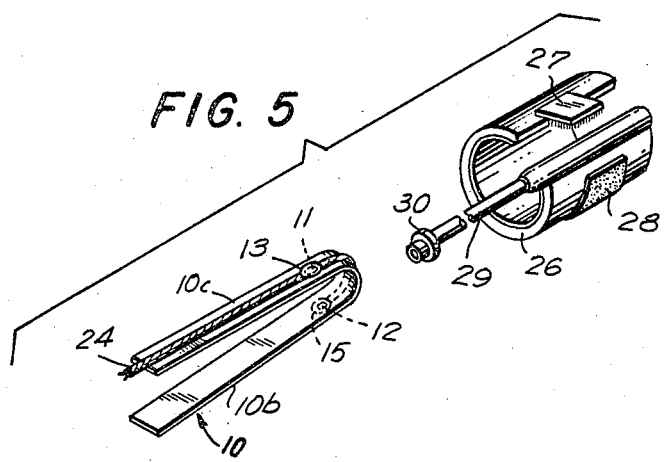
FIG. 5 is a perspective view of a separate pulse detector unit with a variable cuff unit adapted to surround a portion of the pulse detector unit.

The apparatus in accordance with this invention includes a relatively small pulse sensor unit which can be secured to a distal end of an extremity of the patient. The pulse sensor includes a flexible support member which can, for example, be secured to the patient's finger. This flexible support member positions a sub-miniature light source adjacent the cuticle of the patient's finger and a sub-miniature photocell adjacent the opposite side of the finger to complete a unit referred to as the pulse detector. The photocell produces a pulsating electrical signal corresponding to the changes in optical density of the tissues between the light source and the photocell, and hence, the phototcell provides a signal representative of the pulsating flow of blood within the finger. A relatively small inflatable cuff can be permanently secured around the flexible support member, or can be detachably secured. The cuff should be located surrounding some intermediate portion of the finger, preferably the interphalangeal joint.

The control apparatus associated with the cuff and pulse detector includes an air pump capable of periodically inflating the cuff. The pulsating signal developed by the photocell is amplified and then recorded by means of a conventional strip chart recorder. The pressure of the air in the cuff is measured by a suitable transducer and recorded on the strip chart simultaneously with the recording of the blood pressure pulses.

The apparatus operates automatically to gradually increase the air pressure in the cuff. The recorded pulsations remain at a substantial constant amplitude level until the pressure in the cuff exceeds the diastolic pressure for the artery. Further increases of the air pressure within the cuff bring about corresponding decreases in the amplitude of the recorded pulsations. Ultimately a point is reached where the artery is fully occluded so that the pulsations disappear. This occurs when the pressure in the cuff exceeds the systolic pressure. The control apparatus responds to the absence of pulsations to automatically deflate the cuff and, after a suitable period of time, to begin a new cycle. The systolic and diastolic pressures are thereafter determined by noting the recorded pressure corresponding to the first decrease in the amplitude of the pulsations (diastolic pressure) and the pressure corresponding to the point where the pulsations disappear (systolic pressure).

Thus, it can be seen that the apparatus in accordance with this invention can continuously monitor the blood pressure of a patient. In clinical tests it has been found that six measuring cycles can be completed in less than one minute and that successive tests can be performed for more than an hour without any appreciable discomfort to the patient. Furthermore, the pulse sensor can be attached to a finger or toe by means of flexible connectors. Therefore, the patient can perform exercises and engage in other activities while the blood pressure is being monitored.

FIXED CUFF PULSE SENSOR

The pulse sensor unit in accordance with one embodiment of the invention is illustrated in FIGS. 1–4 and includes an inflatable occlusion cuff which is permanently affixed to the pulse detector portion of the unit. This pulse sensor includes a pulse detector support member 10 which maintains a sub-miniature incandescent lamp 11 and a sub-miniature photocell 12 in their proper positions with respect to a finger of the patient. Support member 10 includes a flexible strip which wraps around the end of the finger, and thus includes a portion 10b which underlies the patient's finger, and a portion 10c which overlies the patient's finger. A thimble shaped member 10a, preferably constructed from an opaque flexible material such as rubber, is dimensioned to slip over the curved portion of the flexible strip thereby shielding lamp 11 and photocell 12 from ambient light.

Incandescent lamp 11 is secured within a suitable plastic housing 13 which also positions a small Plexiglas window 14 between the lamp and the finger. Housing 13 is mounted on portion 10c of the flexible strip so that lamp 11 and window 14 are positioned approximately above the cuticle of the finger. Photocell 12 is secured within a similar plastic housing 15 and a Plexiglas window 16 is positioned between photocell 12 and the finger. Housing 15 is secured to portion 10b of the flexible strip so that the photocell is diametrically opposite lamp 11. Thus, the light produced by lamp 11 passes through window 14, then passes through the finger and thereafter passes through window 16 and finally strikes photocell 12. The quantity of light which passes through the finger is a function of the optical density of the finger which in turn is a function of the quantity of blood wihin the arteries. The photocell is preferably a photo resistive type having a resistance which varies in accordance with light intensity. The photocell can be operated to provide a pulsating electrical signal having an amplitude proportional to the change of flow of blood within the finger.

An inflatable occlusion cuff 21 is fabricated as an annular inflatable rubber bladder. Cuff 21 is positioned within a rigid outer retaining ring 20 having an axial length equal to that of the cuff. A pair of flexible retaining rings 18 and 19 are placed surrounding strip portions 10b and 10c as shown in FIG. 2 with retaining ring 18 positioned near the ends of the flexible strip, and retaining ring 19 placed surrounding an intermediate portion between retaining ring 18 and housings 13 and 15. Thereafter, inflatable cuff 21 and retaining ring 20 are placed surrounding retaining rings 18 and 19, with the respective annular edges of the cuff approximately adjacent the centers of rings 18 and 19. Next, the free edges of flexible rings 18 and 19 are rolled back over rigid retaining ring 20 to form the completed structure as shown in FIG. 3. In the completed structure, retaining ring 20 prevents outward expansion of the cuff, and retaining rings 18 and 19 prevent lateral expansion of the cuff.

There is normally a tendency for the occlusion cuff to move along the axis of the finger and force the tissue mass toward the distal end of the finger. This is undesirable since the increased tissue mass at the end of the finger between the lamp and photocell affects the amplitude of the signal developed by the photocell. It should be noted, that with the structure shown in FIGS. 1–4 the finger is supported as though by a splint when the cuff is inflated, and axial movement of the cuff is prevented by retaining rings 18 and 19. Also, the lamp and photocell are relatively light and flexibly supported so that they can move with any movement of the tissue mass.

When cuff 21 is inflated as illustrated in FIG. 3, it expands inwardly and therefore applies pressure to the finger, to occlude the arteries therein. The best occlusion results are obtained when the occlusion cuff is positioned surrounding the joint between the first and second phalanx bones of the finger, i.e., the second joint from the end of the finger.

An outer covering 22 is dimensioned so that is surrounds retaining ring 20 and also loosely covers support member 10 and housings 13 and 15. The outer covering is secured to the outer surface of retaining ring 20 by any suitable fashion, such as cement. An air hose 23 is coupled to inflatable cuff 21 and electrical conductors 24 are connected to lamp 11 and photocell 12. The air hose and the conductors are positioned so that they extend from the open end of the assembly as shown in FIGS. 1 and 3.

A single fixed cuff pulse sensor unit could be designed with dimensions so that it would be adequate for use with all types of patients. However, better operation is achieved by designing the units in three sizes including a small size for children, an intermediate size for women and men with small fingers, and a large men's size. In this manner the units will more closely conform to the size of the patient's finger and thus provide a snugger fit between the inner surface of the cuff and the finger as well as a closer fit between the lamp, photocell and finger when the pulse sensor unit is placed on the patient's finger as shown in FIG. 1.

VARIABLE CUFF PULSE SENSOR

The fixed cuff pulse sensor previously described is adequate for most purposes, but for certain research activities it is desirable that cuffs with various different widths be available. This is achieved by means of the apparatus illustrated in FIGS. 5–7 wherein the pulse detector portion of the unit includes a flexible support member 10 with a lamp 11 and photocell 12 mounted thereon in essentially the same fashion as previously described with respect to FIGS. 1–4.

A number of inflatable cuffs are designed so that they can be placed surrounding portions 10c and 10b of support member 10. These cuffs can be of any desired width typically 1.5, 2.2, 2.5, 3.0 and 6.2 centimeters long. Each of these cuffs should be approximately 12 centimeters long.

These variable cuffs are constructed including a rubber bladder which is covered by a layer of nylon cloth and then a layer of cotton cloth. Each of the variable cuffs are essentially the same except for their width. An air hose 29 is attached to one end of the cuff and has a suitable connector 30 attached to the free end.

A suitable fastener is secured to the outside of the cuff, i.e., secured to the side of the cuff away from the finger when the cuff is wrapped around the finger. The fastener may be of the cloth type as illustrated including one portion 27 secured so that it extends beyond the end of the cuff opposite the air hose connection and another portion 28 which is secured intermediate the ends of the cuff, preferably closer to the air hose connection. Once the two portions of the cloth connector are pressed together, the resulting connection resists any lateral movement, but the two portions of the connector can easily be separated by pulling them apart. The adhering surface of fastener member 27 faces toward the inside of the cuff and the adhering surface of the other fastening member 28 faces outwardly. Fastening member 28 is relatively long so that the cuff can properly be secured surrounding fingers of different diameters.

Figure 6:
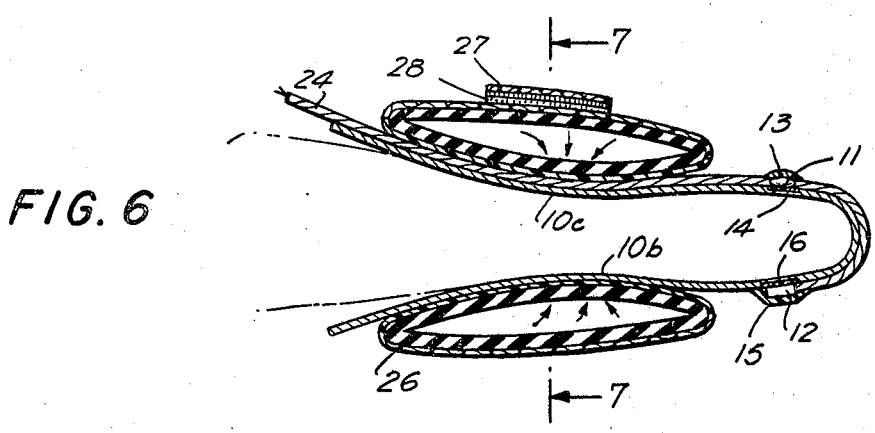
FIG. 6 is a cross sectional view showing the pulse detector unit and a partially inflated variable cuff.
Figure 7:
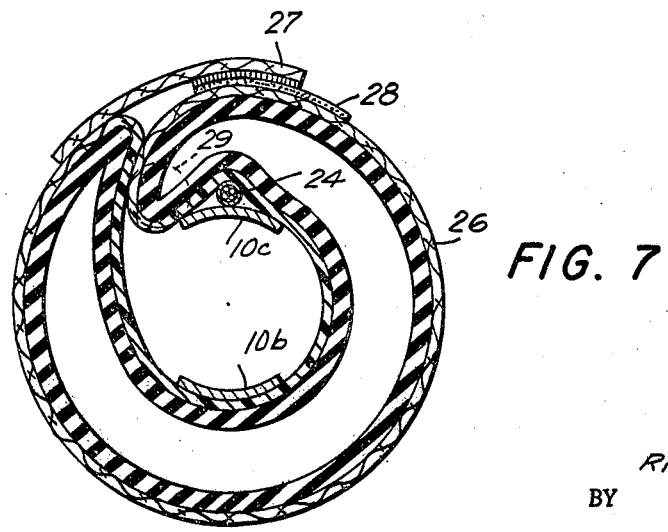
FIG. 7 is a cross sectional view taken along line 7—7 in FIG. 6.

The apparatus shown in FIGS. 5-7 is secured to the patient's finger by first sliding support member 10 over the end of the finger thereby properly positioning the lamp and the photocell. A selected cuff member is thereafter wrapped around the finger and around portions 10c and 10b of support member 10 as shown in FIG. 7 so that the cuff has a reasonably snug fit. Thereafter, when the cuff is inflated, pressure is applied to an intermediate portion of the patient's finger as shown in FIG. 6.

CONTROL SYSTEM

Figure 8:
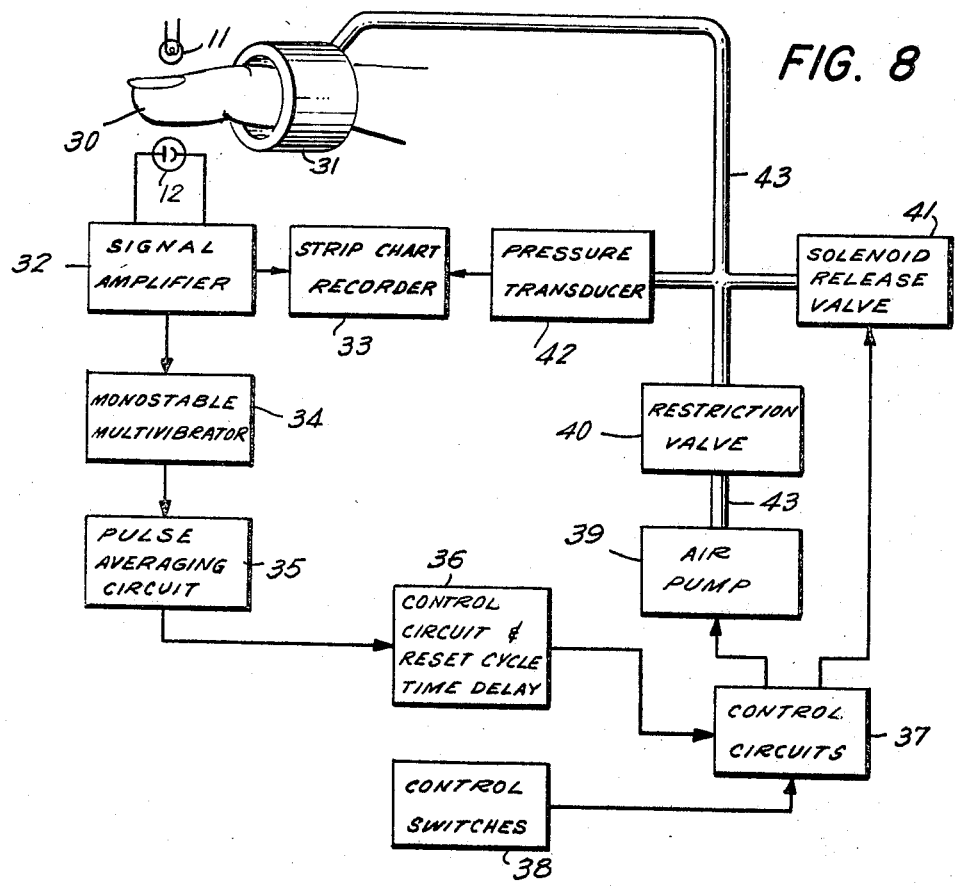
FIG. 8 is a block diagram illustrating the control system.

The control system which can be employed with the combined pulse sensor units of the types shown in FIGS. 1-4 and 5-7 is illustrated in block diagram form in FIG. 8.

A light source, typically a small incandescent lamp 11 energized from a suitable electrical source, is located just above the cuticle of the patient's finger 30, or in other words, is located at the distal end of the finger. Photocell 12, which is of the variable resistive type, is located adjacent the surface of the finger opposite lamp 11. Thus, electromagnetic energy emitted by lamp 11 passes through the finger and then strikes photocell 12. The quanity of light reaching the photocell is a function of the optical density of the finger which in turn is a function of the quantity of blood in the arteries of the finger at the distal end.

Figure 9:
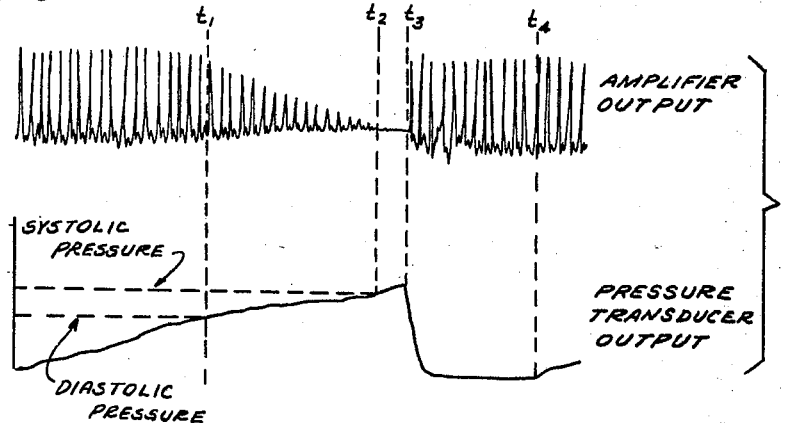
FIG. 9 is a drawing illustrating the wave forms of the signals provided by the signal amplifier and the pressure transducer as these waveforms appear on the strip chart of the recorder shown in FIG. 8.

Thus, photocell 12 is capable of providing a pulsating electrical signal representative of the pulsating flow of blood in the finger. The photocell is connected to the input of a signal amplifier 32 which amplifies the pulsating signal and applies the amplified signal to a conventional strip chart recorder 33. The signal is recorded on the strip chart and appears as indicated in FIG. 9.

The output of the signal amplifier is also supplied to a monostable multivibrator 34 which converts the pulsating signal into a corresponding train of regularly shaped pulses, each such pulse having the same amplitude and time duration. The separation between adjacent pulses is in accordance with the patient's pulse rate. The pulses generated by multivibrator circuit 34 are supplied to a pulse averaging circuit 35 which provides a relatively smooth signal having an amplitude proportional to the patient's pulse rate. The output signal from the averaging circuit can be supplied to a suitable voltmeter device (not shown) to provide a visual indication of the patient's pulse rate.

The output from the averaging circuit is supplied to control circuits and reset cycle time delay circuits 36 and 37 which in turn control an air pump 39 and a solenoid release valve 41. The air pump is connected to inflatable cuff 31 surrounding finger 30 via a restriction valve 40, these connections being completed by means of suitable air hose couplings 43. The restriction valve is manually adjustable to control the rate at which air is supplied to the cuff, and hence, to control the rate at which the cuff is inflated. The solenoid release valve is coupled to the cuff via air hose 43 and is of the type which is closed when energized and opened when de-energized. A conventional pressure transducer 42 is also coupled to air hose 43, and provides an electrical signal proportional to the cuff pressure. This electrical signal is in turn supplied to strip chart recorder 33 and is recorded on the strip chart simultaneously with the pulse signal provided by amplifier 32. The cuff pressure signal is preferably recorded on a separate track of the strip chart and appears as shown in FIG. 9. It is desirable that both signals recorded on the strip chart have the same time base.

The presence of a patient's finger between lamp 11 and photocell 12 produces a pulsating signal at the output of the signal amplifier and a corresponding output signal from averaging circuit 35. The control circuits respond to the presence of the averaging circuit output signal and energize air pump 39 and solenoid valve 41 so that the cuff is gradually inflated. Recorder 33 responds to the cuff pressure signal from transducer 42 and the pulsating signal from amplifier 32 to provide the patterns shown in FIG. 9.

Initially, the cuff pressure is less than the artery diastolic pressure, and hence there is no significant occlusion in the patient's artery, and therefore, the pulse signal remains at a substantially constant amplitude. When the cuff pressure exceeds the diastolic pressure, which occurs at time $t_1$ (FIG. 9) the arteries become occluded and begin to restrict the flow of blood. As a result, the amplitude of the pulsating signal decreases as the cuff pressure increases between times $t_1$ and $t_2$. When the cuff pressure reaches the artery systolic pressure, which occurs at time $t_2$, the artery is fully occluded and the pulsating signal disappears.

As soon as the pulse signal has disappeared, the output signal from averaging circuit 35 begins to fall and soon drops close to zero by time $t_3$. In response thereto, the control circuits deenergize pump 39 and solenoid 41. This causes valve 41 to open and therefore the cuff is deflated reducing the cuff pressure to zero. Thereafter, the control circuit provides a time delay and then, at time $t_4$, again energizes the pump and solenoid to begin a new cycle by again inflating the cuff.

The time constants for the control system are typically adjusted so that a cycle of operation is completed every twenty seconds. More specifically, restriction valve 40 is typically adjusted so that the cuff is normally inflated to a pressure exceeding the systolic pressure in approximately ten seconds and reset cycle time delay circuit 36 is typically adjusted to provide a ten second delay.

The diastolic and systolic pressures are easily determined from the strip chart. As indicated in FIG. 9, the diastolic pressure is the indicated pressure corresponding in time to the first decrease in the pulsating signal amplitude. The systolic pressure is the indicated pressure corresponding in time to the disappearance of the pulsating signal.

CIRCUITS IN CONTROL SYSTEM

The signal amplifier which amplifies the pulsating signal provided by photocell 12 is shown in FIG. 10a. The signal amplifier includes three amplifier stages including PNP type transistors 50, 51 and 52 respectively. These amplifier stages are followed by an emitter follower stage including a PNP type transistor 53.

Photocell 12, shown as a variable resistance type, is connected in series with a resistor 54 between a negative source of potential and ground. A Zener diode 55 is connected across the series combination of resistors 54 and photocell 12 to maintain a fixed potential across these components, the anode of the diode being connected to the negative source of potential and the cathode being connected to ground. A pulsating signal proportional to the pulsating flow of blood in the patient's finger is developed at the junction between resistor 54 and photocell 12, and this junction is coupled to the base of transistor 50 via a coupling capacitor 56. A resistor 57 is connected between the base of transistor 50 and the negative source of potential and a resistor 58 is connected between the base and ground. Resistors 57 and 58 form a voltage divider which provides the proper biasing potential at the base of transistor 50.

The emitter of transistor 50 is connected to ground via a resistor 60 and the collector of the transistor is connected to the negative source of potential via an output resistor 59. Thus, the pulsating signal developed by the photocell is amplified by transistor 50 which in turn develops an output signal across resistor 59.

The collector of transistor 50 is coupled to the base of transistor 51 via a coupling capacitor 61 and the collector of transistor 51 is coupled to the base of transistor 52 via a coupling capacitor 66. A resistor 62 is connected between the base of transistor 51 and the negative source, a resistor 63 is connected between the base and ground, a resistor 64 is connected between the collector and the negative source of potential and a resistor 65 is connected between the emitter and ground. Accordingly, the signal developed across resistor 59 is amplified by transistor 51 and a corresponding output signal is developed across resistor 64.

The base of transistor 52 is connected to the negative source via a resistor 67 and to ground via a resistor 68, the collector is connected to the negative source via a resistor 69 and the emitter is connected to ground via a resistor 70. Thus, the signal developed across resistor 64 is amplified by transistor 52 and a corresponding output signal is developed across resistor 69.

The collector of transistor 52 is connected to the base of transistor 53 in the emitter follower stage by means of a coupling capacitor 71. The base of transistor 53 is connected to the junction between series connected resistors 72 and 73, these resistors being connected between the negative source and ground to form a voltage divider which provides the proper bias potential for transistor 53. The collector of transistor 53 is connected directly to the negative source and the emitter thereof is connected to ground via an output resistor 74. Transistor 53 develops an output signal across resistor 74 corresponding to the signal developed across resistor 69. As is characteristic of emitter follower circuits, the circuit has a low output impedance to provide the proper coupling to other components in the control system. The emitter of transistor 53 is connected to the input of the strip chart recorder via a coupling capacitor 75 and is also coupled to the input of the monostable multivibrator circuit shown in FIG. 10b by means of a coupling capacitor 76.

The monstable multivibrator circuit illustrated in FIG. 10b includes an input trigger stage including a PNP type transistor 80 and a multivibrator stage including a pair of interconnected PNP type transistors 81 and 82.

The collector of transistor 53 (FIG. 10a) is connected to the base of transistor 80 via coupling capacitor 76. The collector of transistor 80 is connected to a negative source of potential via a resistor 83 and the emitter of transistor 80 is connected to ground via a resistor 85. A negative feedback resistor 84 is connected between the collector and base of transistor 80 to provide better stability. Thus, the signal developed at the output of the signal amplifier is further amplified and developed across output resistor 83.

The collector of transistor 80 is coupled to the cathode of a diode 87 via a coupling capacitor 86, and the anode of the diode is connected to the base of transistor 81. The emitters of transistors 81 and 82 are each connected directly to ground, and the collectors thereof are connected to the negative source via resistors 88 and 90 respectively. The collector of transistor 81 is coupled to the base of transistor 82 via a coupling capacitor 92, and the collector of transistor 82 is coupled to the base of transistor 81 via a feedback resistor 91. A resistor 89 is connected between the negative source of potential and the base of transistor 82.

In the quiescent state, transistor 82 is maintained conductive by means of the negative potential applied to the base by means of resistor 89. When transistor 82 is conductive, the potential at the collector of this transistor is very close to ground and therefore, due to the connection via resistor 91, the base of transistor 81 is also close to ground. As a result, transistor 81 is maintained non-conductive in the quiescent state. When a negative pulse appears at the collector of transistor 80, this negative pulse passes through capacitor 86 and diode 87 to drive the base of transistor 81 negative and thereby render transistor 81 conductive. As a result, the collector of transistor 81 is driven positive, i.e., toward ground, and this positive signal passes through capacitor 92 to render transistor 82 non-conductive. Thereafter, transistor 82 remains non-conductive until capacitor 92 discharges via resistor 89. Accordingly, each negative pulse applied to capacitor 86 renders transistor 82 momentarily non-conductive for a predetermined period of time determined by the time constant of capacitor 92 and resistor 89. The resulting negative pulses which appear at the collector of transistor 82 are each of the same width and amplitude.

The pulse averaging circuit is also illustrated schematically in FIG. 10b and includes an averaging capacitor 103 connected between a junction 104 and ground. The collector of transistor 82 is coupled to the cathode of a semiconductor diode 101 via a capacitor 100, and the anode of the diode is connected to junction 104. The junction between capacitor 100 and diode 101 is connected to the anode of a semiconductor diode 102 and the cathode of diode 102 is connected to ground.

The negative pulses developed at the output of the multivibrator circuit pass through capacitor 100 and diode 101 to build up a charge on capacitor 103. Thus, the potential appearing at junction 104 corresponds to the average value of the applied pulses and, since the applied pulses each have the same amplitude and width, the potential at junction 104 is a function of the time interval between successive pulses. Also, when no further pulses are applied, the potential at junction 104 decays and approaches zero.

As previously mentioned, the potential at junction 104 is a function of the time interval between successive pulses and is therefore also proportional to the patient's pulse rate. Thus, junction 104 could be connected to a suitably calibrated voltmeter device to provide a visual indication of the patient's pulse rate.

The potential appearing at junction 104 (FIG. 10b) is applied to the gate element of a silicon controlled rectifier 111 via a gate amplifier circuit shown in FIG. 10c. The gate amplifier circuit includes a PNP type transistor 106. Junction 104 is coupled to the base of transistor 106 via a variable resistor 105. The collector of the transistor is connected to the negative source of potential via a resistor 107 and the emitter of the transistor is connected directly to ground. A resistor 108 is connected in series with a resistor 109 to form a voltage divider connected between the negative source of potential and ground. The cathode of the controlled rectifier 111 is connected to the negative source of potential and the gate element is connected to a variable tap on resistor 109 via a resistor 110. The gate element is also connected to the collector of transistor 106. The variable tap on resistor 109 is adjusted so that the potential between the cathode and gate element of controlled rectifier 111 is insufficient to render the controlled rectifier conductive when transistor 106 is non-conductive.

A silicon controlled rectifier 111 is a PNPN type internally regenerative semiconductor device. Normally the controlled rectifier is non-conductive and blocks current flow in either direction. When a positive potential is applied to the gate element with respect to the cathode, the controlled rectifier becomes conductive if the anode-cathode potential is positive, and thereafter remains conductive until the anode-cathode potential reverse polarity. Thus, when the potential at junction 104 becomes negative, transistor 106 is rendered conductive and develops an output potential across resistor 107. Resistor 107 is effectively connected between the cathode and gate of controlled rectifier 111 and therefore the potential across resistor 107 renders the gate element positive with respect to the cathode when transistor 106 is conductive.

A 110 volt AC signal is applied between a pair of conductors 130 and 131 and supplies the electrical energy for energizing various relays in the control circuit and reset circuit time delay circuits.

The circuit for energizing actuating winding 113 of a relay 112 includes contacts 123 of a relay 120 and the anode-cathode circuit of controlled rectifier 111. More specifically, conductor 130 is connected to the cathode of controlled rectifier 111 via the normally closed contacts of relay 126 including movable contact member 123. The anode of controlled rectifier 111 is connected to one end of actuating winding 113 and the other end of the actuating winding is connected to conductor 131. Thus, winding 113 becomes energized on each alternate half cycle of the AC signal, provided relay 120 is in the deenergized state and provided transistor 106 is conductive to thereby provide the proper gate signal for the controlled rectifier. The high inductance of winding 113 and capacitor 113a connected in parallel with the winding maintain the winding energized between successive pulses.

The air pump 128 and the solenoid release valve 129 are connected in parallel with one another. This parallel combination is connectable between conductors 130 and 131 via the normally open contacts, including movable contact member 114 of relay 112. Thus, the pump and the solenoid are energized when relay 112 becomes energized.

One end of an actuating winding 117 of a relay 116 is connected to conductor 131, and the other end of the winding is connectable to conductor 130 via the normally open contacts including movable contact member 115 of relay 112. A holding circuit for actuating winding 117 is completed via normally closed contacts 127 of relay 125 and the normally open contacts 118 of a relay 116. Thus, when winding 117 becomes energized, and it can thereafter be maintained in the energized state via the holding circuit.

One end of an actuating winding 121 of relay 120 is connected to conductor 131, and the other end is connectable to conductor 130 via normally open contacts 119 of relay 116 connected in series with the normally closed contacts including movable contact member 115.

Relay 125 is a thermal time delay relay including a heating element 126 which is associated with a temperature responsive contact element 127 which is typically in the form of a bi-metallic element. Heating element 126 is connected in series with a variable resistor 124 and normally open contacts 122 of relay 120, and this series combination is connected to a 6.3 volt AC source.

When conductors 130 and 131 are initially energized by closing a suitable switch connected to conductor 130, electrical power is supplied to controlled rectifier 111 and relay winding 113 via contact member 123. Thereafter, when a patient's finger is inserted between photocell 12 and the associated lamp, a negative signal appears at junction 104 which renders transistor 106 conductive to thereby apply a positive gate signal to controlled rectifier 111. As a result, controlled rectifier 111 becomes conductive during each alternate half cycle of the 110 volt source and thus energizes relay 112. When relay 112 becomes energized, winding 117 of relay 116 is energized via contact member 115. Also, air pump 128 and solenoid release valve 129 become energized via contact member 114. Accordingly, the release valve is closed and the air pump begins to inflate the cuff.

Thereafter, when the air pressure in the cuff exceeds the systolic pressure, the pulsating flow of blood in the patient's finger ceases and the pulsating electrical signal provided by the signal amplifier disappears. This causes the potential at junction 104 to decay toward zero thereby rendering transistor 106 and controlled rectifier 111 non-conductive. As a result relay 112 becomes deenergized, but relay 116 is maintained in the energized state by virtue of the holding circuit completed through contacts 127 and 118. When relay 112 becomes denergized, pump 128 and solenoid release valve 129 are also deenergized. As a result, the release valve opens to thereby deflate the cuff. Also, when relay 112 becomes deenergized, relay 120 is energized by means of the circuit completed through contact members 115 and 119.

When relay 121 becomes energized, the circuit for heating element 126 is completed through contact member 124. The quantity of current flowing through heating element 126 is determined by the adjustment of resistor 124 and hence the quantity of heat provided by heating element 126 varies accordingly. After a predetermined period of time, bi-metallic contact element 127 opens thereby interrupting the holding circuit for relay 116. As a result, relay 116 becomes deenergized which in turn deenergizes relay 121 when contact member 119 returns to the normally open position. When relay 121 returns to the deenergized state, power is again applied to controlled rectifier 111 and relay 112 via contact member 123. Thus, a new cycle of operation begins after the time interval determined by time delay relay 125.

While only a few illustrative embodiments of the invention have been illustrated in detail, it should be obvious to those skilled in the art that there are numerous variations within the scope of this invention. The invention is more particularly defined in the appended claims.

What is claimed is:

1. In apparatus for measuring the blood pressure of a patient, the combination of:
   a source of electromagnetic energy;
   an electromagnetic energy responsive device;
   support means having a U-shaped finger splinting member for positioning said source and said device on opposite sides of the distal end of the patient's finger; and
   an inflatable cuff mounted on the support means and adapted to surround an intermediate portion of the patient's finger.

2. Apparatus in accordance with claim 1 further comprising:
   means overlying the outside exposed surfaces of said inflatable cuff to prevent outward expansion of said cuff.

3. In apparatus for measuring the blood pressure of a patient, the combination of:
   a light emitting source;
   a photocell responsive to light emitted by said source;
   support means adapted to at least partially surround the patient's finger and position said source and said photocell on opposite sides of the distal end of the patient's finger;
   an inflatable cuff mounted on said support means and adapted to surround an intermediate portion of the patient's finger; and
   retaining means for securing said cuff to said support means so as to prevent longitudinal movement of said cuff along the finger.

4. Apparatus in accordance with claim 3 wherein said retaining means includes:
   a rigid cylindrical tube surrounding said inflatable cuff to prevent outward expansion of said cuff, and
   a pair of annular members surrounding the support means and partially underlying the cuff and adapted to be folded back over the cuff to enclose the edge thereof, said folded back portion being in underlying contact with the said tube.

5. In a system for measuring the diastolic and systolic blood pressures of a patient, the combination of:
   a source of light;
   a light responsive device responsive to light emitted by said source;
   support means for positioning said source and said device on opposite sides of a distal portion of an extremity of the patient, so that the light received by said device from said source passes through said extremity;

circuit means connected to said device and operative to produce a pulsating electrical signal representative of the pulsating flow of blood in said extremity;

an inflatable cuff adapted to surround an intermediate portion of said extremity;

pump means coupled to said cuff and operable to gradually inflate said cuff at a substantially uniform rate;

transducer means coupled to said cuff and operable to provide an electrical signal proportional to pressure within said cuff; and recording means coupled to said circuit means and said transducer and operative to provide two visible traces having the same time base, one of said traces corresponding to said pulsating signal provided by said circuit means and the other trace corresponding to said electrical signal from said transducer means, whereby the pressure in said cuff which causes the amplitude of said pulsating signal to decrease is the diatolic pressure, and the pressure in said cuff which substantially eliminates said pulsating signal is the systolic pressure.

6. A system in accordance with claim 5 further comprising a release valve coupled to said cuff and operative to deflate said cuff when actuated, and control means connected to said circuit means and operative to actuate said release valve when said electrical pulsating signal is substantially eliminated.

7. A system in accordance with claim 6 wherein said control means includes a time delay circuit operative to again close said release valve after a predetermined time interval from the time at which said pulsating signal is substantially eliminated.

8. A system in accordance with claim 5 wherein said support means is adapted to at least paritally surround the patient's finger.

9. In a system for measuring the diastolic and systolic blood pressures of a patient, the combination of:

a source of light;

a light responsive device responsive to light emitted by said source;

support means for positioning said source and said device on opposite sides of a distal portion of an extremity of the patient, so that the light received by said device from said source passes through said extremity;

circuit means connected to said device and operative to produce a pulsating electrical signal representative of the pulsating flow of blood in said extremity;

electrical pulse generating means connected to respond to said pulsating electrical signal and operative to provide a corresponding train of pulses, each pulse in said train of pulses having the same time duration and amplitude; and an averaging circuit operatively connected to provide an output signal which is a function of the average value of said train of pulses whereby the presence of said output signal indicates the presence of said extremity between said source and said device and the absence of said output signal indicates the absence of pulsating blood flow in said extremity;

an inflatable cuff adapted to surround an intermediate portion of said extremity;

means operatively connected to said cuff
  to inflate said cuff in response to the presence of of said output signal, and
  to thereafter deflate said cuff in response to the absence of said output signal.

10. A system in accordance with claim 9 wherein said last named means includes a time delay circuit connected so that said cuff is again inflated a predetermined period of time after each deflation.

References Cited

UNITED STATES PATENTS

| | | | |
|---|---|---|---|
| 2,801,629 | 8/1957 | Edmark | 128—2.05 |
| 2,989,051 | 6/1961 | Zuidema et al. | 128—2.05 |
| 3,228,391 | 1/1966 | Fitter et al. | 128—2.05 |
| 3,103,214 | 9/1963 | Smith | 128—2 |
| 3,104,661 | 9/1963 | Halpern | 128—2 |
| 3,143,111 | 8/1964 | Greek | 128—2 |
| 3,156,237 | 11/1964 | Edmark | 128—2 |
| 3,189,024 | 6/1965 | Smith | 128—2 |
| 3,229,685 | 1/1966 | Ringkamp | 128—2 |
| 2,540,163 | 2/1951 | Brosene et al. | 128—2 |

RICHARD A. GAUDET, Primary Examiner

K. L. HOWELL, Asssistant Examiner